United States Patent
Duvnjak

(10) Patent No.: US 8,880,691 B2
(45) Date of Patent: Nov. 4, 2014

(54) CONFIDENCE BASED NETWORK MANAGEMENT

(71) Applicant: Dejan Duvnjak, Kanata (CA)

(72) Inventor: Dejan Duvnjak, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 225 days.

(21) Appl. No.: 13/626,279

(22) Filed: Sep. 25, 2012

(65) Prior Publication Data

US 2014/0089489 A1    Mar. 27, 2014

(51) Int. Cl.
*G06F 15/173*    (2006.01)

(52) U.S. Cl.
USPC ............. 709/224; 709/223; 709/225; 700/29; 700/30; 700/44; 700/51; 700/52; 703/2; 703/3; 703/6

(58) Field of Classification Search
CPC ..................................................... G06F 15/173
USPC .................................................. 709/224, 225
See application file for complete search history.

(56) References Cited

U.S. PATENT DOCUMENTS

| 7,243,048 B2 * | 7/2007 | Foslien et al. ................. 702/185 |
| 2011/0125466 A1 * | 5/2011 | Lada .................................. 703/2 |
| 2011/0288837 A1 * | 11/2011 | Blevins et al. ..................... 703/6 |

* cited by examiner

*Primary Examiner* — Jude Jean Gilles
(74) *Attorney, Agent, or Firm* — Kramer Amado P.C.

(57) ABSTRACT

A method, apparatus, and machine readable storage medium is disclosed for managing a communication network wherein statistics are collected and next expected values for the statistics are calculated based on batch mean and confidence interval calculations and an alarm is raised if the next expected value exceeds a threshold.

10 Claims, 3 Drawing Sheets

100

| | Statistic | Current Value | Range (+/-) | Probability (%) | Next Expected Value | Threshold |
|---|---|---|---|---|---|---|
| 113 | Number of connected UEs | 985 | 16 | 95 | 1005 | 1000 |
| 115 | Number of home subscribers | 532 | 5 | 95 | 541 | 1000 |
| 117 | Number of visiting subscribers | 347 | 8 | 95 | 345 | 500 |
| 119 | Number of failed UE attach requests | 239 | 3 | 95 | 240 | 300 |

Columns: 101, 103, 105, 107, 109, 111

FIG. 1

CONFIDENCE BASED NETWORK MANAGEMENT

FIELD OF INVENTION

The invention is directed to digital telecommunications and more specifically, improved network management techniques.

BACKGROUND

Network management systems typically present the user with statistics which define only current and past events. Thus a network management system will inform the user about a network issue only after the problem in the network has occurred. Therefore, improvements to network management systems are highly desirable.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network management system of managing a network. The method comprises the steps of: collecting a statistic; calculating a batch mean for changes in the statistic; calculating a confidence interval for the statistic; calculating a next expected value for the statistic; and raising an alarm if the next expected value exceeds a predefined threshold.

Various embodiments are described wherein the statistic comprises a network statistic.

Various embodiments are described wherein the statistic is selected from the set of: number of connected user equipments (UEs) on a network element; number of failed UE attach requests; number of home subscribers on a mobile network; number of visiting subscribers on a mobile network; number of UE paging failures; network element peak CPU usage; network element average CPU usage; network element memory usage; number of times a link is down; number of links failing; number of ports down; total number of bytes sent to a port; total number of bytes received by a port; total number of bytes sent to a card; total number of bytes received by a card; maximum data rate across a link; and average data rate across a link.

Various embodiments are described wherein the confidence interval is calculated by performing a look-up from a Student's t-distribution2 chart for an operator-defined confidence level.

Various exemplary embodiments relate to a network management system comprising: an interface for communicating with network nodes; memory adapted to store statistics; and a processor operable to: collect a statistic; calculate a batch mean for changes in the statistic; calculate a confidence interval for the statistic; calculate a next expected value for the statistic; and raise an alarm if the next expected value exceeds a predefined threshold.

Various exemplary embodiments relate to a tangible and non-transitory machine-readable storage medium encoded with instructions for execution by a network management system, the tangible and non-transitory machine-readable storage medium comprising: instructions for receiving collecting a statistic; instructions for calculating a batch mean for changes in the statistic; instructions for calculating a confidence interval for the statistic; instructions for calculating a next expected value for the statistic; and instructions for raising an alarm if the next expected value exceeds a predefined threshold.

BRIEF DESCRIPTION OF THE FIGURES

Some embodiments of apparatus and/or methods in accordance with embodiments of the present invention are now described, by way of example only, and with reference to the accompanying drawings in which:

FIG. 1 illustrates a table with next expected values according to an embodiment of the invention;

In the figures, like features are denoted by like reference characters.

DETAILED DESCRIPTION

Figure 2:
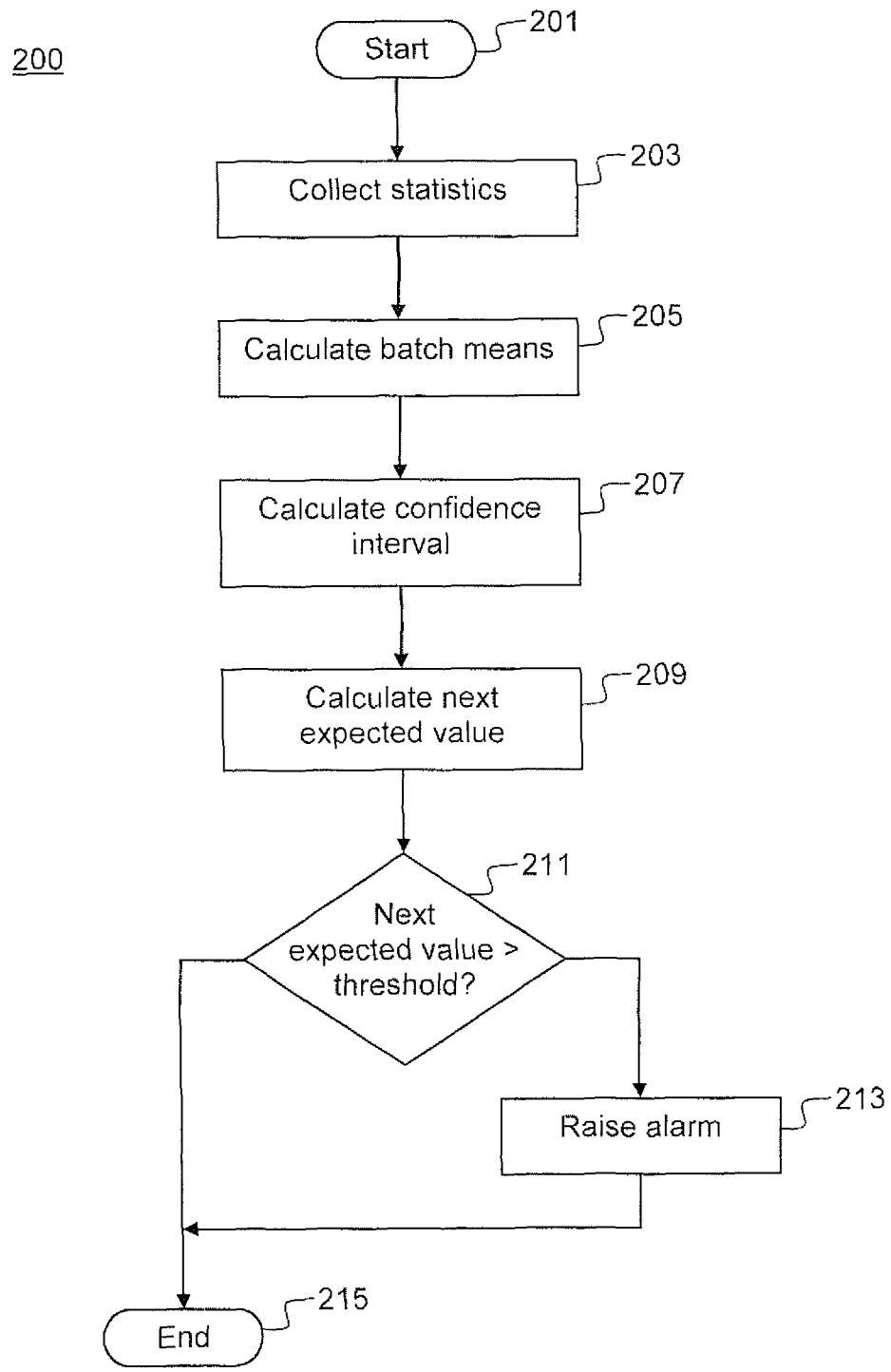
FIG. 2 illustrates a process flow diagram according to an embodiment of the invention.

Embodiments disclose a network management system that will inform the user of potential problems in the network using extrapolated network statistics. The network management system will provide the user with a table of 'next expected values' for all of the statistics that are collected by the network management system. This table will also provide a (+/−) range for the 'next expected values', and the level of confidence (probability specified by the user) that the 'actual next value' is within that range. This information will then be used by the network management system to provide the user with warnings and alarms which will indicate potential problems before they happen.

These values are calculated by using the changes in the values of the statistics which are typically already collected by the network management system. The changes are treated as random variables of unknown distribution, mean and variance. A confidence interval is calculated by applying the method of batch means to these variables, and the next expected value for each statistic is based on this confidence interval.

The following are some examples of various statistics within a network management system that could be monitored and managed according to embodiments of the present invention:

For network services and application statistics: number of connected user equipments (UEs) on a network element; number of failed UE attach requests; number of home subscribers on a mobile network; number of visiting subscribers on a mobile network; number of UE paging failures.

For central processing unit (CPU) and Memory statistics: network element peak CPU usage; network element average CPU usage; network element memory usage.

For physical equipment and bandwidth: number of times a link is down; number of links failing; number of ports down; total number of bytes sent to a port; total number of bytes received by a port; total number of bytes sent to a card; total number of bytes received by a card; maximum data rate across a link; average data rate across a link.

Referring now to the drawings, in which like numerals refer to like components or steps, there are disclosed broad aspects of various exemplary embodiments.

With reference FIG. 1, a network management system is provided with a table 100 of next expected values 109 for the statistics 101 that are collected, the (+/−) range 105 for the 'next expected values', and the probability 107, specified by an operator that the 'actual next value' is within that range. In the example of FIG. 1, statistics 101 include the number of connected UEs 113, the number of home subscribers 115, the number of visiting subscribers 117, and the number of failed UE attach requests 119. For each statistic 101, the table stores the current value 103, the range (+/−) 105, an operator-specified probability 107, a calculated next expected value 109 and a predefined threshold 111 for each statistic.

FIG. 2 illustrates a process flow diagram of a process executed by a network management system according to an embodiment of the invention. The process starts at step 201. At step 203 the network management system collects statistics. These statistics can be any one of the statistics enumerated above or other statistics as would be apparent to persons of skill in the art. These statistics are collected on a regular basis at predefined intervals as is typical in a network management system. The current value 103 for each statistic is collected.

After collecting this statistic enough times for a confidence level (probability specified by the operator) to be reached, the 'next expected value' for this statistic can be calculated and updated. The following calculations use the change (delta) in a statistic, which is the change between the current value and the previous current value. A large number of these deltas are collected, and then used at step 205 where the network management system calculates a batch mean for each statistic. To calculate the sample mean of a batch of samples (where Sj is a sample, and m is the number of samples), the following formula can be used:

$$X_m = \frac{1}{m}\sum_{j=1}^{m} S_j$$

Then, to calculate the sample mean of the batch sample means that are collected for a statistic (where Xj is a batch sample mean, and n is the number of batches used), the following formula can be used:

$$M_n = \frac{1}{n}\sum_{j=1}^{n} X_j$$

Then, to calculate the variance of the batch sample means, the following formula can be used:

$$V_n^2 = \frac{1}{n-1}\sum_{j=1}^{n} (X_j - M_n)^2$$

At step 207 the network management system calculates a confidence interval for each statistic based on the batch means. Then, to calculate the confidence interval (where $Z_{\alpha/2, n-1}$ can be looked up from a Student's t-distribution[2] chart, knowing the confidence level (probability) (for example 95%, select by the operator) and the number of degrees of freedom which is n−1), the following formula can be used:

$$\left(M_n - \frac{Z_{\alpha/2,n-1} V_n}{\sqrt{n}}, M_n + \frac{Z_{\alpha/2,n-1} V_n}{\sqrt{n}}\right)$$

To calculate the range 105 smaller value of the confidence interval is subtracted from the larger value of the confidence interval, and the result is divided by 2.

At step 209 the network management system calculates a next expected value for each statistic based on the confidence interval. The next expected value can be calculated by adding the two values of the confidence interval and dividing the sum by 2 and adding this result to the current value 103.

At step 211 the network management system determines if the next expected value for a statistic exceeds a predetermined threshold for that statistic and if so, at step 213 the network management system raises an alarm to notify an operator of an impending issue so that the operator can make a decision such as for example, performing a load balancing operation in order to relocate some UEs from one node to a node with more available capacity, prior to an overload situation occurring in the network. The process then ends at step 215. If the next expected value for a statistic does not exceed the predetermined threshold then no action is taken and the process proceeds directly to step 215 and ends.

In the example of table (100) in FIG. 1, the next expected value (109) of the number of connected UEs (113) is calculated to be 1005 which exceeds the threshold (111) of 1000. In this case the network management system would raise an alarm to the operator.

Figure 3:
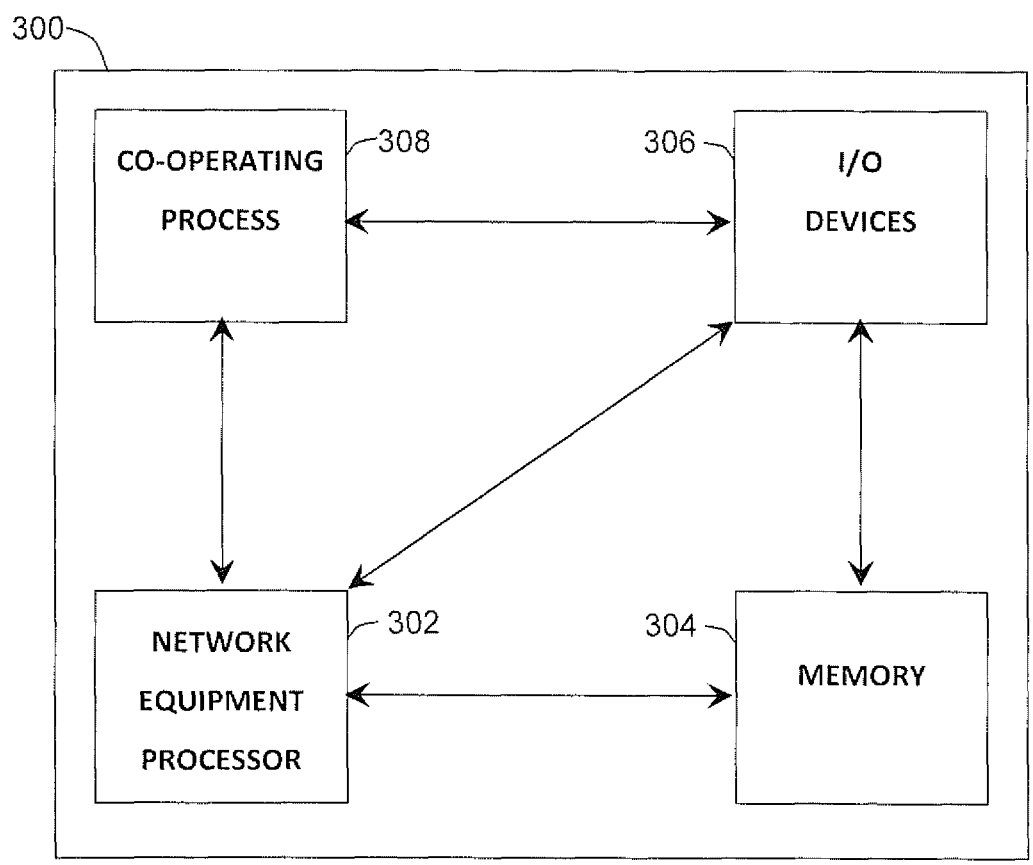
FIG. 3 illustrates an exemplary network element processor assembly according to an embodiment of the invention.

FIG. 3 depicts a high-level block diagram of a network equipment processor assembly suitable for use in performing functions described herein.

As depicted in FIG. 3, network equipment processor assembly 300 includes a network equipment processor element 302 (e.g., a central processing unit (CPU) and/or other suitable processor(s)), a memory 304 (e.g., random access memory (RAM), read only memory (ROM), and the like), a cooperating module/process 308, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It is contemplated that some of the steps discussed herein as methods may be implemented within hardware, for example using one or more application specific integrated circuits (ASIC), and/or any other hardware equivalents. Alternatively, according to one embodiment, the cooperating process 308 can be loaded into memory 304 and executed by network equipment processor 302 to implement the functions as discussed herein. As well, cooperating process 308 (including associated data structures) can be stored on a tangible, non-transitory computer readable storage medium, for example magnetic or optical drive or diskette, semiconductor memory and the like. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Numerous modifications, variations and adaptations may be made to the embodiments of the invention described above without departing from the scope of the invention, which is defined in the claims.

What is claimed is:

1. A method performed by a network management system of managing a network, said method comprising the steps of:
    collecting a statistic;
    calculating a batch mean for changes in said statistic;
    calculating a confidence interval for said statistic;
    calculating a next expected value for said statistic; and
    raising an alarm if said next expected value exceeds a predefined threshold.

2. The method of claim 1, wherein said statistic comprises a network statistic.

3. The method of claim 1, wherein said statistic is selected from the set of: number of connected user equipments (UEs) on a network element; number of failed UE attach requests; number of home subscribers on a mobile network; number of visiting subscribers on a mobile network; number of UE paging failures; network element peak CPU usage; network element average CPU usage; network element memory usage; number of times a link is down; number of links failing; number of ports down; total number of bytes sent to a port; total number of bytes received by a port; total number of bytes sent to a card; total number of bytes received by a card; maximum data rate across a link; and average data rate across a link.

4. The method of claim 1, wherein said confidence interval is calculated by performing a look-up from a Student's t-distribution$^2$ chart for an operator-defined confidence level.

5. A network management system comprising:
    an interface for communicating with network nodes;
    memory adapted to store statistics; and
    a processor operable to:
        collect a statistic;
        calculate a batch mean for changes in said statistic;
        calculate a confidence interval for said statistic;
        calculate a next expected value for said statistic; and
        raise an alarm if said next expected value exceeds a predefined threshold.

6. The network management system of claim 5 wherein said statistic comprises a network statistic.

7. The network management system of claim 5 wherein said confidence interval is calculated by performing a look-up from a Student's t-distribution$^2$ chart for an operator-defined confidence level.

8. A tangible and non-transitory machine-readable storage medium encoded with instructions for execution by a network management system, the tangible and non-transitory machine-readable storage medium comprising:
    instructions for receiving collecting a statistic;
    instructions for calculating a batch mean for changes in said statistic;
    instructions for calculating a confidence interval for said statistic;
    instructions for calculating a next expected value for said statistic; and
    instructions for raising an alarm if said next expected value exceeds a predefined threshold.

9. The tangible and non-transitory machine-readable storage medium of claim 8, wherein said statistic comprises a network statistic.

10. The tangible and non-transitory machine-readable storage medium of claim 8, wherein said confidence interval is calculated by performing a look-up from a Student's t-distribution$^2$ chart for an operator-defined confidence level.

* * * * *